Patented Aug. 14, 1951

2,563,808

UNITED STATES PATENT OFFICE 2,563,808

WATER-DISPERSIBLE COMBINATION PRODUCTS OF GOSSYPOL AND CARBOHYDRATES

Aaron M. Altschul and Leah E. Castillon, New Orleans, La., assignors to the United States of America as represented by the Secretary of Agriculture No Drawing. Application July 11, 1950,
Serial No. 173,220

9 Claims. (Cl. 260—609)

(Granted under the act of March 3, 1883, as
amended April 30, 1928; 370 O. G. 757)

This invention relates to the preparation of water-soluble or water-dispersible products of gossypol by combination with materials of natural origin. This application is copending with our application Ser. No. 173,221 filed July 11, 1950.

Gossypol is a naturally occurring pigment of cottonseed which is present to the extent of 0.5 to 1.5 percent by weight of the kernels. This pigment is concentrated in the pigment glands of the cottonseed and comprises 35 to 50 percent of the weight of these glands. Certain solvents such as petroleum naphthas or chlorinated hydrocarbons can be used to extract the oil from flaked cottonseed kernels without materially affecting the pigment glands or removing substantial quantities of their contents. Other solvents such as alcohols, ethers, and ketones rupture the pigment glands and extract their contents with the oil present in the seed.

It has been found that oil-free cottonseed meals containing intact pigment glands are toxic when fed in certain specific amounts to certain animals such as chicks and pigs. When, however, the pigment gland contents are removed along with the oil, the resulting meal gives no evidence of any physiological toxic effects. It has been established that intact pigment glands of cottonseed are toxic to animals and considerable experimental evidence suggests that one of the principal factors contributing to the toxicity of pigment glands is the gossypol contained therein.

In the normal practice of processing cottonseed for oil and meal by the hydraulic- or continuous screw-press methods, in which heat and pressure are applied to flaked or rolled cottonseed meats, the pigment glands are ruptured and their contents react with the surrounding extra-glandular materials. Whereas in raw cottonseed meats, the amount of free gossypol, that is gossypol which is readily extractable by aqueous acetone or chloroform, varies from 0.5 to 1.5 percent, very little free gossypol can be detected in hydraulic or screw-press meal. In some of the newly developed methods of processing by solvent extraction of the oil, the cottonseed meats are cooked prior to extraction in order to facilitate extraction and the oil-free flakes are cooked after extraction to detoxify them. Gossypol is also destroyed by these processes and generally cannot be detected in the oil-free meals.

If, however, the oil is extracted without application of heat by solvents which do not cause the rupture of the pigment glands or by the new method of fractionation whereby the pigment glands are separated intact from the oil and meal (pending application of Boatner, Hall, and Merrifield, Serial No. 675,118, filed June 7, 1946, now United States Patent 2,482,141), the gossypol remains unchanged. By use of the solvent extraction method, the gossypol is found in the oil-free meal and in the gland fractionation process, in the separated pigment glands. In either case gossypol can be recovered from the meal or pigment glands by extraction with a suitable solvent such as aqueous acetone and can be purified to yield pure crystalline material.

Gossypol is a new by-product of processing cottonseed and can materially increase the value of cottonseed to the farmer and processor. It has been suggested that gossypol may have pharmaceutical uses and may be used as an insecticide. Biological research with this material and its application to new uses is difficult, however, because of its insolubility in water.

The object of our invention is to prepare products of gossypol which are either water soluble or water dispersible. We have found that gossypol may be combined with soluble or dispersible carbohydrate material to form a new product which is soluble in neutral water or buffer solution to the extent of approximately 10 percent. Whereas a mixture of gossypol and water is not toxic to fish, a dispersion of the new gossypol-carbohydrate product when put into water in a concentration of one part to 20,000 parts of water kills goldfish in less than two hours.

The products of our invention and the methods for preparing these products are further illustrated but not limited by the following examples.

*Example 1.*—One gram of potato starch was made into a thick slurry with 10 ml. of cold distilled water. This slurry was added to 90 ml. of hot distilled water and the starch solution allowed to cool to room temperature. One gram of gossypol was added to the starch solution and aqueous sodium hydroxide added until the pH of the solution was increased to 10.3, bringing about complete solution of the gossypol. Hydrochloric acid solution was then added to neutralize the solution to pH of 7. This solution was dried by lyophilization to yield a dry product which formed a colloidal dispersion in neutral aqueous solution. This material was toxic to goldfish in concentrations of 1 part to 20,000 parts of water.

*Example 2.*—To 100 ml. of a 2% aqueous solution of dextrose was added two grams of pure gossypol. Upon raising the pH of the solution to 10.3 with aqueous sodium hydroxide, a clear yellow solution was obtained. This solution was neutralized to pH 7 by addition of hydrochloric acid solution, frozen, and dried by lyophilization. The dry residue was soluble in water at neutral pH and toxic to goldfish in dilutions of 1 part to 20,000 parts of water.

The invention herein described may be manufactured and used by or for the Government of the United States of America for governmental purposes throughout the world, without the payment to us of any royalty thereon.

Having thus described our invention, what we claim is:

1. The process of preparing a water-dispersible toxic product of gossypol, comprising dissolving gossypol and a water-dispersible carbohydrate in dilute aqueous alkali, neutralizing with acid, and drying under vacuum.

2. The process of claim 1 in which the drying is by lyophilization.

3. The process of preparing a water-dispersible toxic product of gossypol, comprising dissolving gossypol and a carbohydrate of the group consisting of starch and dextrose in dilute aqueous alkali, and neutralizing with acid.

4. The process of claim 7 in which the product is dried by lyophilization.

5. The process of claim 3 in which the carbohydrate is starch.

6. The process of claim 3 in which the carbohydrate is dextrose.

7. The water-dispersible toxic product prepared by dispersing gossypol and a water-dispersible carbohydrate in dilute aqueous alkali and neutralizing with acid.

8. The water-dispersible, toxic product prepared by dispersing gossypol and dextrose in dilute aqueous alkali, neutralizing with an acid, and drying by lyophilization.

9. The water-dispersible, toxic product prepared by dispersing gossypol and starch in dilute aqueous alkali, neutralizing with acid, and drying by lyophilization.

AARON M. ALTSCHUL.
LEAH E. CASTILLON.

REFERENCES CITED

The following references are of record in the file of this patent:

UNITED STATES PATENTS

| Number | Name | Date |
|---|---|---|
| 2,484,831 | Hutchins | Oct. 18, 1949 |

OTHER REFERENCES

Clark: J. Biol. Chem. 76, 229–234 (1928).

Murty: Chemical Abstracts 40, 3219 (1946).

Winton: The Structure and Composition of Foods, vol. I, pp. 566–569, Wiley, N. Y., 1932.